3,335,130
AZIRIDINIUM POLYHALOPHENOLATES
Stephen J. Kuhn, Sarnia, Ontario, Canada, assignor to The Dow Chemical Company, Midland, Mich., a corporation of Delaware
No Drawing. Filed Oct. 7, 1964, Ser. No. 402,330
19 Claims. (Cl. 260—239)

This invention relates to new compounds which are salts of an aziridine and a polyhalophenol. They may be represented by the formula

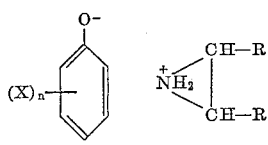

wherein each R is H or an inert radical, such as alkyl or aryl, n is an integer 3–5 and each X is a halogen, not necessarily all the same.

Phenol reacts with an aziridine, not to form a salt but to open the aziridine ring, thus producing a 2-aminoalkyl phenyl ether or a polymer of the aziridine, or both (L. B. Clapp, J. Am. Chem. Soc., 73, 2584 (1951)). Monobromophenol was shown by Clapp to catalyze polymerization of the aziridine, though it did not form a bromophenyl ether.

In view of the known ease with which the aziridine ring is opened and/or the aziridine is polymerized, it was surprising to find that the polyhalophenols containing at least three halogen substituents on the phenolic aromatic ring can be reacted with an aziridine having an unsubstituted imino group in the aziridine ring to produce the aziridinium salt of the phenol in good yield and purity and that these salts are sufficiently stable for ready isolation and storage under ordinary conditions.

The salts of the invention are conveniently made by contacting the halophenol with the aziridine, preferably in an inert, anhydrous solvent at a temperature below that at which the salt decomposes or the aziridine polymerizes, preferably below 50° C. Suitable solvents include the aliphatic and aromatic hydrocarbons, ethers, etc., in which the reactants are soluble but, preferably, in which the salts are substantially insoluble. The salts then precipitate as formed and are thus easily isolated in substantially pure form.

The practice of the invention is illustrated by the following examples.

*General procedure*

Equimolecular amounts of halophenol and aziridine compound were separately dissolved in ether and the aziridine solution was then slowly added, with stirring, to the phenol solution at about 0° C. The salt precipitated as formed and was separated in pure form by filtration. A slight increase in yield was obtained by evaporation of the ether filtrate. The use of a slight excess (1–2 percent) of aziridine assures complete reaction of the phenol and improves the purity of the product since the excess aziridine is both volatile and highly soluble in ether.

Table I shows some typical products made as set forth above.

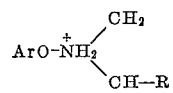

TABLE I

| Ar | R | M.P., °C. | Yield percent | N percent Calc'd | N percent Found |
|---|---|---|---|---|---|
| 2,4,6-trichlorophenyl | H | 60–61 | 94 | 5.83 | 5.78 |
| 2,4,6-tribromophenyl | H | 78–80 | 98 | 3.74 | 3.75 |
| 2,3,4,6-tetrachlorophenyl | H | 87 | 97 | 5.09 | 5.06 |
| Do | CH₃ | 104–105 | 95 | 4.84 | 4.80 |
| Pentafluorophenyl | H | 102–104 | 97 | 6.16 | 6.15 |
| Do | CH₃ | 102–103 | 95 | 5.81 | 5.90 |
| Pentachlorophenyl | H | 123–124 | 98 | 4.50 | 4.44 |
| Do | CH₃ | 113–115 | 97 | 4.33 | 4.32 |
| Pentabromophenyl | H | 128–129 | 99 | 2.63 | 2.63 |
| Do | CH₃ | 125–126 | 98 | 2.56 | 2.58 |

Other aziridines which can be similarly converted to halophenolate salts include 2-ethyl-, 2-n-butyl-, 2-sec.-butyl-, 2-tert.-butyl-, 2,3-dimethyl-, 2,3-di-n-butyl-, 2-methyl-3-ethyl-, 2-propyl-3-isobutyl- and 2-ethyl-3-sec.-butyl-, 2-phenyl-, 2-ethyl-3-phenyl-, 2,3-diphenyl- and 2-methyl-3-(chlorophenyl) aziridine.

Other operable halophenols include 2,4,5-trichloro-, 2,3,5-tribromo-, 3,4,5-trifluoro, 2,3,4,5-tetrafluoro-, 2,3,4,6-tetrabromo- and 2,4-dichloro-6-bromophenol.

The salts of the invention are crystalline solids which, in the absence of protic solvents, are stable at ordinary temperatures and, usually, up to their melting points. They are useful as herbicides and as chemical intermediates. They are a convenient source of the aziridines since the salts are readily decomposed by alkali to regenerate the free base. They are reactive with protic materials, such as alcohols, phenol, primary and secondary amines and acids, whereby the aziridine ring is opened by the active hydrogen compound to produce the same product as would the free aziridine in reacting with the protic reactant.

I claim:
1. A crystalline compound having the formula

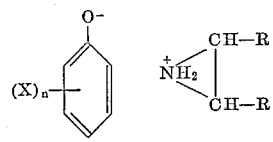

wherein each R is an inert radical selected from the group consisting of H, alkyl and aryl radicals and contains not more than 6 carbon atoms, n is an integer 3–5 and each X is a halogen.

2. A compound as defined in claim 1 wherein at least one R is H.

3. A compound as defined in claim 1 wherein each R is H.

4. A compound as defined in claim 1 wherein each X is Cl.

5. A compound as defined in claim 1 wherein each X is Br.

6. A compound as defined in claim 1 wherein each X is F.

7. Aziridinium 2,4,6-trihalophenolate.

8. 2-methylaziridinium 2,4,6-trihalophenolate.
9. Aziridinium pentahalophenolate.
10. 2-methylaziridinium pentahalophenolate.
11. Aziridinium 2,4,6-trichlorophenolate.
12. Aziridinium 2,4,6-tribromophenolate.
13. Aziridinium 2,3,4,6-tetrachlorophenolate.
14. Aziridinium pentachlorophenolate.
15. Aziridinium pentabromophenolate.
16. Aziridinium pentafluorophenolate.
17. The process for making the crystalline aziridinium polyhalophenolate of claim 1 comprising reacting by contacting at a temperature below the decomposition point of the polyhalophenolate and in an inert anhydrous solvent, a polyhalophenol of the formula

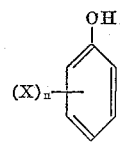

wherein each X is halogen and $n$ is an integer 3–5, with an aziridine of the formula

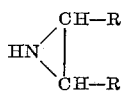

wherein each R is H, alkyl or aryl and contains not more than 6 carbon atoms.

18. The process defined in claim 17 wherein the temperature is 0–25° C. and the solvent is an ether.
19. The process defined in claim 18 wherein the reaction is effected by adding an ether solution of a slight excess of the aziridinine to an ether solution of the halophenol.

References Cited

UNITED STATES PATENTS 2,188,734    1/1940    Carswell _____ 71—2.3

FOREIGN PATENTS 1,137,968    6/1957    France.

OTHER REFERENCES

Braude et al.: Determination of Organic Structures by Physical Methods (New York, 1955), pp. 587–596.

Chem. Abstracts, Sixth Collective Index, Subject MI– PK, vols. 51–55 (1957–1961), pp. 8690s–8692s, 8696s, and 8698s–8699s.

Schatz et al.: J. Am. Chem. Soc., vol. 77, pp. 5113–5118 (1955).

ALEX MAZEL, *Primary Examiner.*

ALTON D. ROLLINS, *Examiner.*